United States Patent [19]

Bible et al.

[11] 4,280,532

[45] * Jul. 28, 1981

[54] CONTROL UNIT AND METHOD OF MAKING THE SAME

[75] Inventors: Harley V. Bible, Maryville; William T. Moon, Jr., Knoxville, both of Tenn.

[73] Assignee: Robertshaw Controls Company, Richmond, Va.

[ * ] Notice: The portion of the term of this patent subsequent to Sep. 23, 1997, has been disclaimed.

[21] Appl. No.: 128,628

[22] Filed: Mar. 10, 1980

Related U.S. Application Data

[62] Division of Ser. No. 906,490, May 17, 1978, Pat. No. 4,223,701.

[51] Int. Cl.³ .............................................. F16K 27/02

[52] U.S. Cl. ...................................... 137/882; 60/290; 137/881; 137/885; 137/DIG. 8

[58] Field of Search ................... 60/290; 137/DIG. 8, 137/881, 882, 885

[56] References Cited

U.S. PATENT DOCUMENTS

| | | | |
|---|---|---|---|
| 3,480,041 | 11/1969 | Whitlock | 137/625.5 X |
| 4,099,539 | 7/1978 | Brakebill . | |
| 4,153,078 | 5/1979 | Yamazaki et al. | 137/882 |
| 4,178,953 | 12/1979 | White | 60/290 X |
| 4,223,701 | 9/1980 | Bible et al. | 137/882 |

*Primary Examiner*—Gerald A. Michalsky

*Attorney, Agent, or Firm*—Candor, Candor & Tassone

[57] ABSTRACT

A control unit having a plurality of pneumatically operated valve constructions for controlling the fluid flow from a first fluid source in relation to the condition of a second fluid source that is adapted to be inter-connected to the pneumatically operated valve constructions, the control unit having a self-contained housing structure carrying the valve constructions therein in substantially a circular array and having a centrally arranged inlet substantially concentric to the circular array and being adapted to be interconnected to the first fluid source.

10 Claims, 6 Drawing Figures

CONTROL UNIT AND METHOD OF MAKING THE SAME

CROSS REFERENCE TO RELATED APPLICATION

This application is a divisional patent application of its copending parent patent application, Ser. No. 906,490, filed May 17, 1978, now U.S. Pat. No. 4,223,701.

BACKGROUND OF THE INVENTION

1. Field of the Invention

This invention relates to an improved control means having a plurality of pneumatically operated valve constructions in a self-contained housing structure and to the method of making such a control means or the like.

2. Prior Art Statement

It is known to provide a plurality of pneumatically operated valve constructions for controlling the fluid flow from a first fluid source, such as from the air pump of an automobile, in relation to the condition of a second fluid source, such as the manifold vacuum of the internal combustion engine of the automobile, that is adapted to be interconnected to the pneumatically operated valve constructions, such pneumatically operated valve constructions being fluidly interconnected together by flexible conduits and the like.

It is known to incorporate a plurality of pneumatically operated valve constructions in a single housing, such as by utilizing stacked channel plates and the like so that a self-contained housing structure is provided therefor.

For example, see the U.S. Pat. No. 4,099,539 to Brakebill.

SUMMARY OF THE INVENTION

It is a feature of this invention to provide a self-contained housing structure that will carry therein a plurality of pneumatically operated valve constructions that were previously utilized individually and were required to be separately interconnected together by flexible conduit means or the like.

Another feature of this invention is to arrange the pneumatically operated valve constructions in the single housing structure in a manner to minimize space as well as provide access to like areas of all the pneumatically operated valve constructions.

In particular, one embodiment of this invention provides a control means having a plurality of pneumatically operated valve constructions for controlling the fluid flow from a first fluid source in relation to the condition of a second fluid source that is adapted to be interconnected to the pneumatically operated valve constructions, the control means having a self-contained housing structure carrying all of the valve constructions therein in substantially a circular array thereof and having a centrally arranged inlet substantially concentric to the circular array of valve constructions and being adapted to be interconnected to the first fluid source.

Such a housing structure can comprise three housing sections secured together in stacked relation with like parts of the valve construction all being disposed in the same housing section.

Accordingly, it is an object of this invention to provide an improved control means having one or more of the novel features of this invention as set forth above or hereinafter shown or described.

Another object of this invention is to provide a method of making such a control means or the like, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein;

DESCRIPTION OF THE PREFERRED EMBODIMENT

Figure 1:
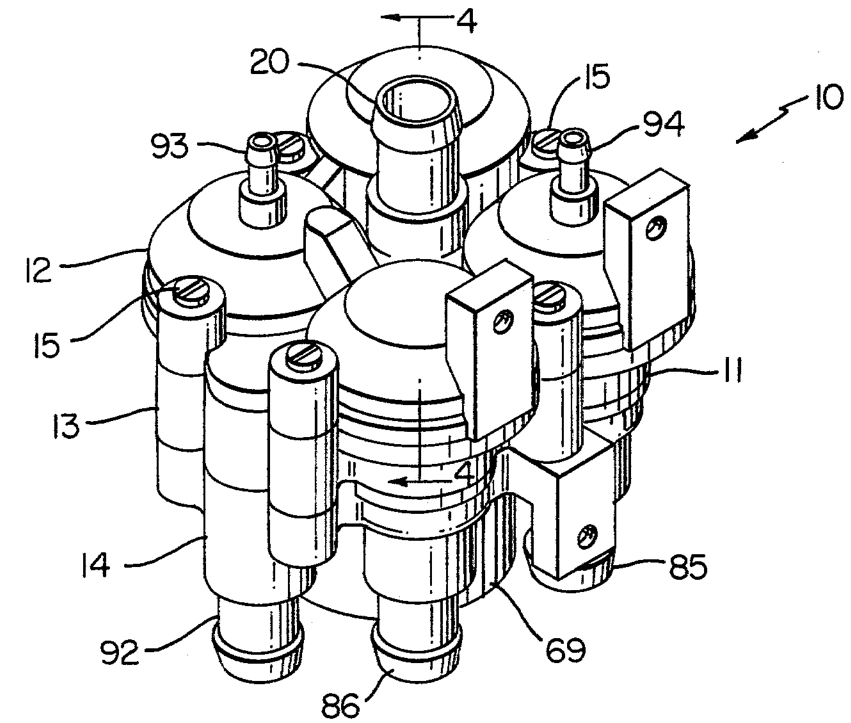
FIG. 1 is a top perspective view illustrating the improved control means of this invention
Figure 2:
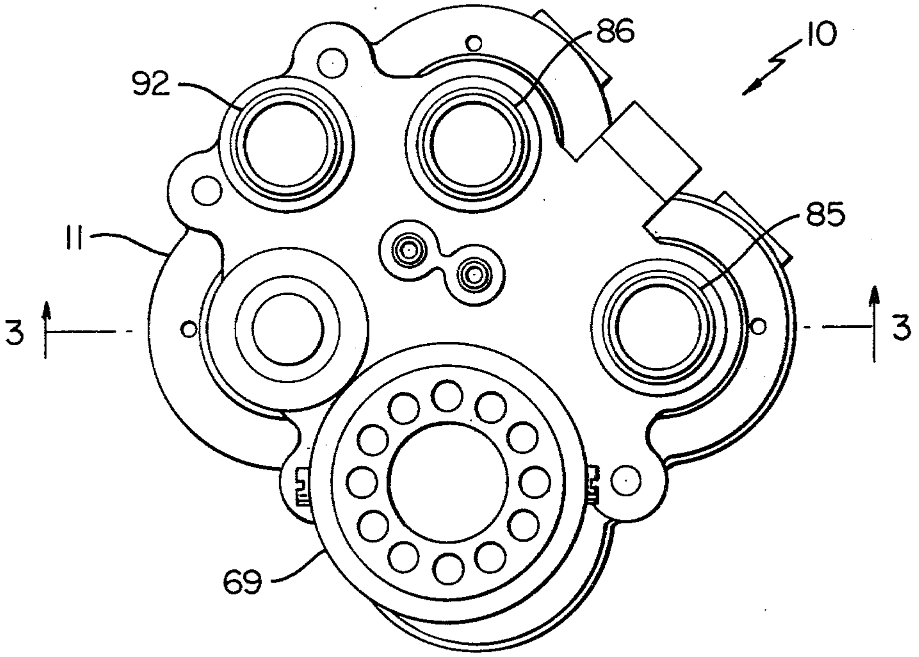
FIG. 2 is a bottom view of the control means illustrated in FIG. 1.
Figure 3:
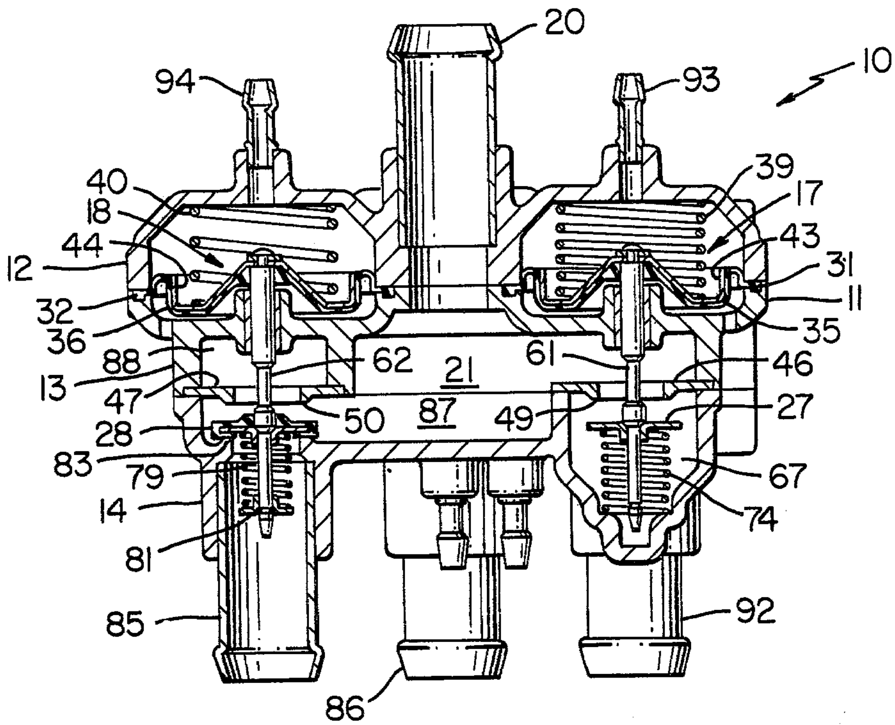
FIG. 3 is a cross-sectional view taken on line 3—3 of FIG. 2.
Figure 4:
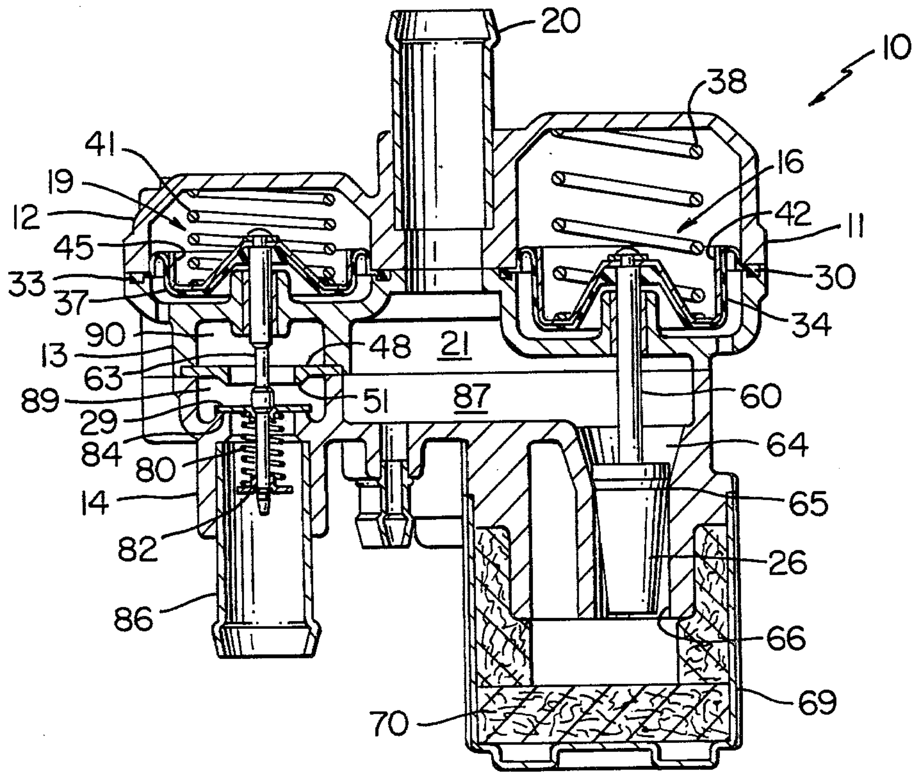
FIG. 4 is a cross-sectional view taken on line 4—4 of FIG. 1.
Figure 5:
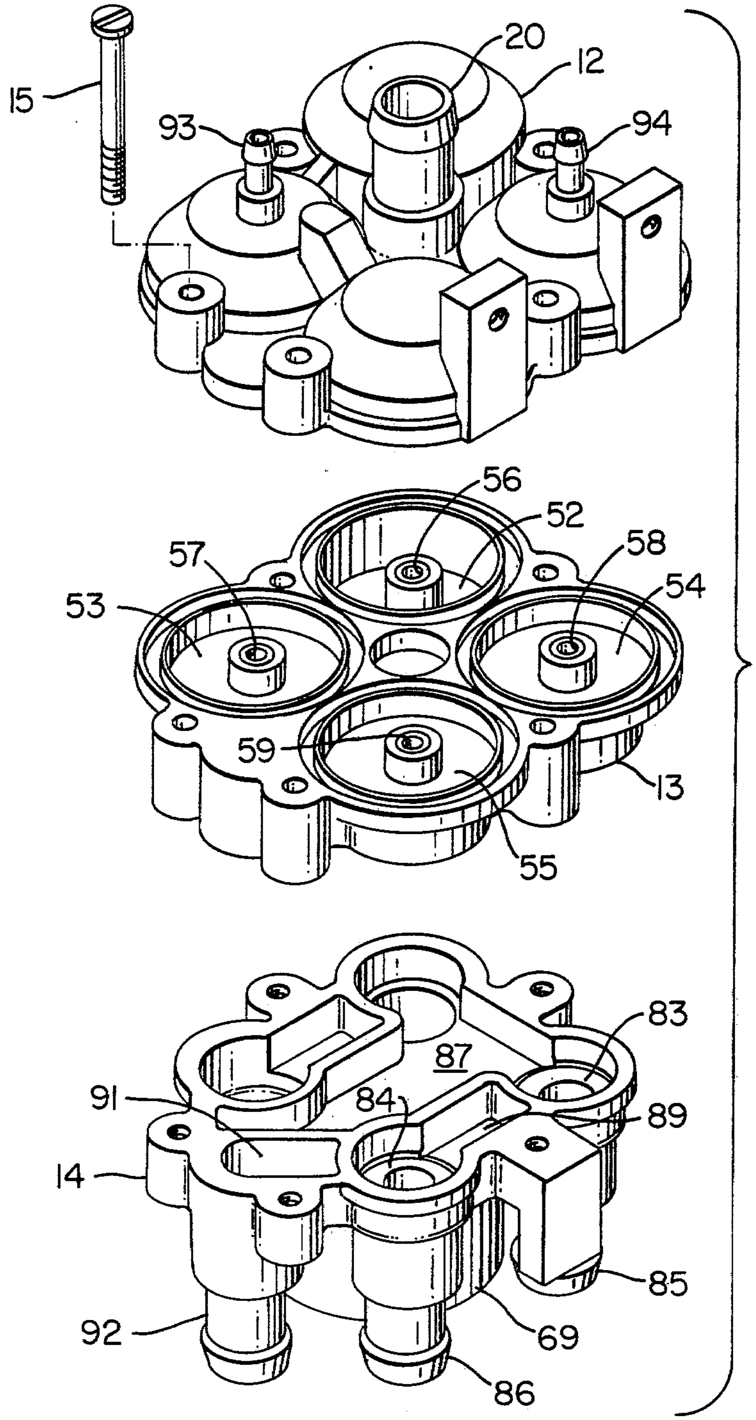
FIG. 5 is an exploded perspective view of the housing sections that form the control means of FIG. 1.

While the various features of this invention are hereinafter described and illustrated as being particularly adapted to provide a control means for controlling the flow of air from an air pump of an automobile or the like in relation to the value of the vacuum in the vacuum manifold of the automobile, it is to be understood that the various features of this invention can be utilized singly or in any combination thereof to provide a control means for other devices as desired.

Therefore, this invention is not to be limited to only the embodiment illustrated in the drawings, because the drawings are merely utilized to illustrate one of the wide variety of uses of this invention.

Referring now to FIGS. 1-4, the improved control means of this invention is generally indicated by the reference numeral 10 and comprises a self-contained housing structure 11 that is formed of three housing sections 12, 13 and 14 secured together by suitable threaded fastening means 15 so as to be disposed in stacked relation with the housing section 13 being an intermediate housing section and the housing sections 12 and 14 respectively being outboard housing sections as illustrated.

The housing sections 12-14 are formed in a manner hereinafter set forth by the method of this invention to carry within the housing structure 11 four pneumatically operated valve constructions that are generally indicated by the reference numerals 16, 17, 18 and 19.

The housing sections 12-14 are uniquely formed to carry the pneumatically operated valve constructions 16-19 in a minimum of space by having the pneumatically operated valve constructions 16-19 disposed in a circular array concentric to a centrally disposed inlet 20 that is interconnected to the outboard housing section 12 and leads to an internal chamber 21 in the intermediate housing section 13 as illustrated.

In order to permit the valve constructions 16-19 to be disposed in the circular array illustrated, the outboard housing section 12 is formed in a unique manner to define in part actuating chambers 22, 23, 24 and 25 respectively for the pneumatically operated valve constructions 16–19.

Likewise, the other outboard housing section 14 is uniquely formed to receive valve members 26, 27, 28 and 29 of the respective pneumatically operated valve constructions 16–19.

In addition, the outboard housing section 12 cooperates with the intermediate housing section 13 to secure the outer peripheral portions 30, 31, 32 and 33 of a plurality of flexible diaphragms 34, 35, 36 and 37 therebetween and utilized respectively for the pneumatically operated valve constructions 16–19. The chambers 22–25 in the outboard housing section 12 respectively contain coiled compression springs 38, 39, 40 and 41 for bearing against diaphragm reinforcing cups 42, 43, 44 and 45 respectively for the flexible diaphragms 34–37 to tend to urge the diaphragms 34–37 to their down condition as illustrated in the drawings for a purpose hereinafter described.

The intermediate housing section 13 and the other outboard housing section 14 are so constructed and arranged that the same are adapted to secure annular valve seat members 46, 47 and 48 therebetween to respectively have their valve seats 49, 50 and 51 positioned to be opened and closed by the valve members 27, 28 and 29 of the pneumatically operated valve constructions 17, 18 and 19 as will be apparent hereinafter.

The intermediate housing section 13 has web portions 52, 53, 54 and 55 respectively closing off the lower sides of the flexible diaphragms 34–37 from the intermediate chamber 21 thereof, the web portion 52–55 respectively have openings 56, 57, 58 and 59 passing therethrough and receiving actuator stems 60, 61, 62 and 63 that respectively interconnect the flexible diaphragms 34–37 to their respective valve members 26–29 as illustrated.

The housing section 14 is formed to define a chamber 64 that is disposed in communication with the chamber 21 of the intermediate housing section 13 as illustrated and leads to a conical valve seat 65 that is interconnected to the atmosphere through an opening 66, the conical valve seat 65 being adapted to be opened and closed by the frusto-conical valve member 26 for a purpose hereinafter described.

Figure 6:
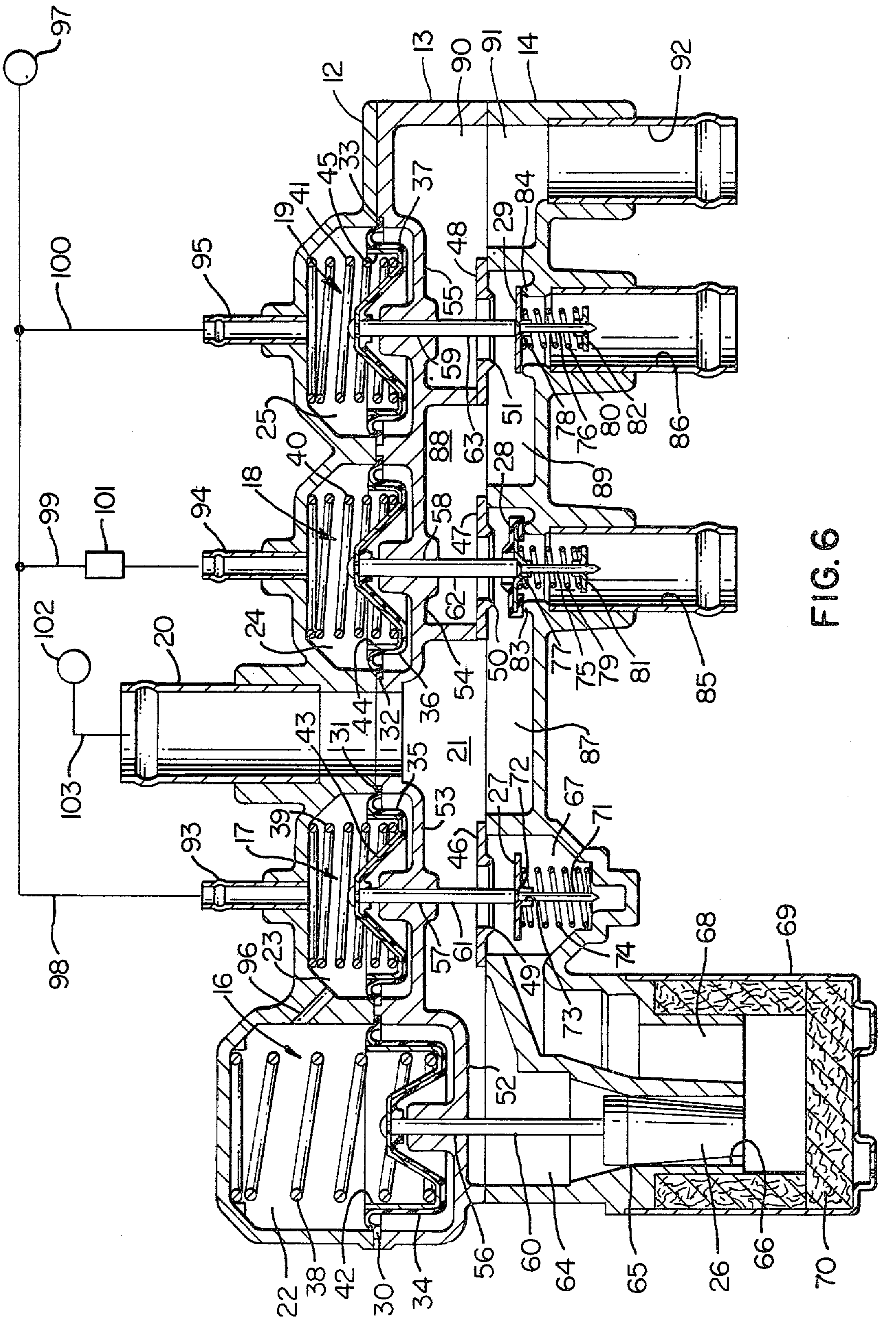
FIG. 6 is a schematic cross-sectional view illustrating the operating parts of the control means of FIG. 1.

The valve seat member 46 cooperates with the housing section 14 to define a chamber 67 that will be interconnected to the chamber 21 of the intermediate housing section 13 when the valve member 27 is in the opened condition as illustrated in FIG. 6, the chamber 67 of the housing section 14 being interconnected to an outlet passage 68 disposed adjacent the outlet passage 66 as illustrated.

If desired, a suitable filter cup 69 can be arranged to cover the adjacent outlet 66 and 68 so that any air flow therefrom will pass through filter means 70 before being directed to the atmosphere for a purpose hereinafter described whereby the cup 69 and filter means 70 act as a noise silencer for the air flow therethrough.

The stem 61 of the pneumatically operated valve construction 17 has a reduced portion 71 that forms a shoulder 72 with the main body of the stem 61, the reduced portion 71 being loosely received in an opening 73 formed through the valve member 27 so that the valve member 27 is adapted to move on the reduced portion 71 of the stem 61. However, a compression spring 74 is disposed in the chamber 67 and bears against the valve member 27 as illustrated to tend to urge the valve member 27 against the shoulder 72 of the stem 61 so that the valve member 27 will tend to follow the movement of the stem 61.

However, when the diaphragm 35 of the pneumatically operated valve construction 17 is pulled upwardly by a certain vacuum condition existing in the chamber 23, in opposition to the force of the compression spring 39, the stem 61 pulls the valve member 27 upwardly therewith until the valve member 27 engages the valve seat 49 to close the valve seat 49. Thereafter any further upward movement of the stem 61 permits the stem 61 to move relative to the valve member 27 as the compression spring 74 will maintain the valve member 27 in its closed condition against the valve seat 49.

Similarly, the valve stems 62 and 63 for the pneumatically operated valve constructions 18 and 19 have reduced portions 75 and 76 respectively defining shoulders 77 and 78 against which the valve members 28 and 29 are urged by compression springs 79 and 80 which respectively bear against the valve members 28 and 29 as well as against spring retainers 81 and 82 secured to the lower ends of the reduced portions 75 and 76 of the stems 62 and 63.

In this manner, the valve members 28 and 29 can respectively close the valve seats 50 and 51 and permit their respective stems 62 and 63 to further move upwardly therefrom.

The housing section 14 is formed to define annular valve seats 83 and 84 respectively coaxially aligned and spaced from the valve seats 50 and 51 to be respectively opened and closed by the valve members 28 and 29 as illustrated when the respective diaphragms 36 and 37 are in their down condition, the valve seats 83 and 84 respectively leading to outlets 85 and 86 carried by the outboard housing section 14 as illustrated.

The housing section 14 is formed with a cavity or chamber 87 which is disposed in communication with the chamber 21 of the intermediate housing section 13 and is directed to the valve seats 50 and 83 so as to be either connected to the outlet 85 when the valve seat 83 is opened by the valve member 28 or to a chamber or cavity 88 formed in the intermediate housing section 13 when the valve seat 50 is opened by the valve member 28 as illustrated in FIG. 6.

The housing section 14 has another chamber or cavity 89 formed therein that is disposed in communication with the chamber 88 of the intermediate housing section 13 as well as to the valve seats 51 and 84 whereby the chamber 89 is adapted to be interconnected to the outlet 86 when the valve member 29 is in an opened condition relative to the valve seat 84 and is adapted to be interconnected to a chamber or cavity 90 formed in the intermediate housing section 13 when the valve seat 51 is opened by the valve member 29 in the manner illustrated in FIG. 6.

The chamber 90 of the intermediate housing section 13 is disposed in communication with a chamber 91 of the outboard housing section 14 which, in turn, is interconnected to an outlet 92 as illustrated.

Thus, it can be seen that the three housing sections 12–14 of this invention can be cast, machined and/or molded into the unique shapes illustrated to readily permit the same to carry therein the four pneumatically operated valve constructions 16–19 in a circular array thereof with the inlet 20 being substantially concentrically disposed relative to the circular array of pneumatically operated valve constructions 16–19 so that the overall self-contained structure 11 is relatively compact and does not require any external piping or flexible conduit means to interconnect the pneumatically operated valve constructions 16–19 together as such interconnection is provided by the actual structure of the housing sections 12–14 in the manner previously described.

Also, it can be seen that the outboard housing section 12 contains the actuator means for all of the valve constructions 16–19 and the outboard housing section 14 contains the valve members and seats for all of the valve constructions 16–19 while the intermediate housing section 13 provides for the air flow connection between the valve constructions 16–19.

In order to interconnect a vacuum source to the actuating chambers 22–25 of the pneumatically operated valve constructions 16–19, inlet fixtures 93, 94 and 95 can be respectively carried by the outboard housing section 12 and be disposed in fluid communication with the chambers 23, 24 and 25 as illustrated, the chamber 23 of the pneumatically operated valve construction 17 being disposed in fluid communication with the chamber 22 of the pneumatically operated valve construction 16 by an internal passage 96 formed in the housing section 12 as illustrated in FIG. 6.

In this manner, a vacuum source 97, FIG. 6, can be interconnected to the inlet tubes 93–95 by conduit means 98, 99 and 100 as illustrated, the conduit 99 having a thermally operated valve means 101 therein for a purpose hereinafter described.

The outlets 85, 86 and 92 can be respectively interconnected to desired structure as will be apparent hereinafter while the outlets 66 and 68 are interconnected to the atmosphere.

A fluid pressure source 102 is adapted to be interconnected to the inlet tube 20 by a conduit means 103 for a purpose hereinafter described.

Thus, it can be seen that the control means 10 of this invention can be formed with a self-contained housing means 11 to contain the pneumatically operated valve constructions 16–19 that are adapted to function in a manner now to be described.

In a typical automobile application of the control means 10 of this invention and with the internal combustion engine thereof running, the air supply pump 102 is driven by the engine and supplies air under pressure to the chamber 21 of the housing means 11 through the inlet 20 whereby if the valve member 27 of the pneumatically operated valve construction 17 is in the opened condition thereof as illustrated in FIG. 6, such air pressure is dumped or exhausted through the filter and silencing means 69, 70 by the outlet 68, the valve members 28 and 29 being disposed in the closed condition against the valve seats 83 and 84 so that such air pressure in the chamber 21 would be adapted to pass through the opened valve seats 50 and 51 to the outlet 92 for any desired purpose if the dump valve member 27 should be closed against the valve seat 49.

However, when the manifold 97 is creating a vacuum, evacuation takes place in the chamber 23 of the pneumatically operated valve construction 17 so that when the pressure differential across the diaphragm 35 subsequently reaches a certain value, the diaphragm 35 moves upwardly in opposition to the force of the compression spring 39 to close the valve member 27 against the valve seat 49 and thereby prevent dumping of the air pressure in the chamber 21 to the atmosphere through the silencer 69, 70 by way of the outlet 68.

Such vacuum condition also now exists in the chamber 22 of the pneumatically operated valve construction 16 because of the interconnecting port or passage 96 so that the valve member 26 meters a certain bleeding of the air pressure in the chamber 21 to the atmosphere through the silencer 69, 70 by the valve member 26 being positioned relative to the valve seat 65 depending upon the pressure differential across the diaphragm 34 of the pneumatically operated valve construction 16.

The pneumatically operated valve construction 17 acts as a pressure relief valve for the air pressure in the chamber 21 as well as a dump valve as previously described.

In particular, with the valve member 27 disposed in the closed position against the valve seat 49, should the air pressure in the chamber 21 of the intermediate housing section 13 exceed a certain value, the same will act downwardly on the valve member 27 and cause the valve member 27 to slightly open the valve seat 49 to bleed excess pressure out through the silencer 69, 70 by way of the outlet 88.

Also, should the vacuum value in the chamber 23 of the pneumatically operated valve construction 17 fall below the value thereof that causes the valve member 27 to be disposed in the closed position, the force of the compression spring 39 will open the valve member 27 away from the valve seat 49 to dump the air pressure in the main chamber 21 to the atmosphere through the silencer 69, 70 by way of the outlet 68 as previously described.

The temperature responsive device 101 in the conduit 99 is so constructed and arranged that the same senses the temperature of the engine of the automobile and if the temperature sensed by the device 101 is above a predetermined value, the valve means 101 will block the vacuum source 97 from the chamber 24 of the pneumatically operated actuator 18 and under such conditions, the compression spring 40 maintains the valve member 28 against the valve seat 83 so that the valve seat 50 is in an open condition to interconnect the main air chamber 21 to the chamber 89 of the housing section 14. At this time, if the vacuum value of the chamber 25 of the pneumatically operated valve construction 19 is above a certain value, the compression spring 41 maintains the valve member 29 against the valve seat 84 so that the chamber 21 is, in effect, interconnected through the open valve seats 50 and 51 to the outlet 92 to feed air at a certain pressure to a control means for any desired purpose. Conversely, should the vacuum value of the chamber 25 of the pneumatically operated valve construction 19 be above a certain value, the pressure differential across the diaphragm 37 will pull the valve member 29 upwardly to close the valve seat 51 so that the chamber 21 is now interconnected to the open valve seat 50 and open valve seat 84 to the outlet 86 to feed air at a certain pressure to a control means for any desired purpose.

However, should the temperature being sensed by the device 101 be such that the device 101 interconnects the vacuum source 97 to the chamber 24 of the pneumatically operated valve construction 18, the diaphragm 36 thereof is pulled upwardly in opposition to the force of the compression spring 40 to cause the valve member 28 to close the valve seat 50 and open the valve seat 83 so that the main supply chamber 21 is interconnected to the outlet 85 through the open valve seat 83 to be fed to a desired control means and will not be interconnected to either the outlets 86 or 92 regardless of the condition of the pneumatically operated valve construction 19.

As previously stated, such metering and directing of the air pressure is old in the art. However, it can be seen that the control means 10 of this invention is adapted to function for the desired air management purpose while combining all of the pneumatically operated valve constructions 16–19 thereof into a single package construction in a unique manner that not only saves space, but also provides a savings in cost and eliminates the need for interconnecting conduit means and the like between the various valve constructions as in the past.

Accordingly, it can be seen that this invention not only provides an improved control means, but also this invention provides an improved method of making such a control means or the like.

While the form and method of this invention, now preferred, have been described and illustrated as required by the Patent Statute, it is to be understood that other forms and method steps can be utilized and still fall within the scope of the appended claims.

What is claimed is:

1. In a control means having a plurality of pneumatically operated valve constructions for controlling the fluid flow from a first fluid source in relation to the condition of a second fluid source that is adapted to be interconnected to said pneumatically operated valve constructions, each valve construction having a flexible diaphragm means interconnected to a valve member by an actuator stem, the improvement comprising a self-contained housing structure carrying said valve constructions therein in substantially a circular array thereof and having a centrally arranged inlet substantially concentric to said circular array and being adapted to be interconnected to said first fluid source, said housing structure comprising two outboard housing sections and an intermediate housing section secured together in stacked relation, each said diaphragm means being held between said intermediate housing section and one of said outboard housing sections, each said valve member being disposed in the other of said outboard housing sections, said intermediate housing section having a chamber therein interconnected to said inlet and leading to certain of said valve constructions, said other housing section having a plurality of valve seats respectively controlled by said valve members and having a plurality of outlets respectively associated with said valve seats, at least one of said valve constructions having its said actuator stem passing through its respective valve seat whereby said valve seat of said one valve construction is intermediate said valve member thereof and said diaphragm means thereof, said valve member of said one valve construction being movable on its respective actuator stem.

2. A control means as set forth in claim 1 wherein said actuator stem of said one valve construction has a shoulder, and a spring carried by said actuator stem of said one valve construction and bearing against said valve member thereof in a direction tending to hold said valve member against said shoulder.

3. A control means as set forth in claim 2 wherein said spring bears against said valve member in a direction that tends to close said valve seat of said one valve construction.

4. A control means as set forth in claim 3 wherein said one valve construction has a second valve seat in said other housing section adapted to be opened and closed by said valve member thereof.

5. A control means as set forth in claim 3 wherein said one valve construction has said valve seat thereof exposed to said chamber on the side of said valve seat opposite the side thereof that is controlled by said valve member thereof whereby said spring performs a relief valve function for said chamber.

6. In a method of making a control means having a plurality of pneumatically operated valve constructions for controlling the fluid flow from a first fluid source in relation to the condition of a second fluid source that is adapted to be interconnected to said pneumatically operated valve constructions, each valve construction having a flexible diaphragm means interconnected to a valve member by an actuator stem, the improvement comprising the steps of forming a self-contained housing structure that carries said valve constructions therein in substantially a circular array thereof, forming said housing structure to have a centrally arranged inlet substantially concentric to said circular array and be adapted to be interconnected to said first fluid source, forming said housing structure to comprise two outboard housing sections and an intermediate housing section secured together in stacked relation, secureing each said diaphragm means between said intermediate housing section and one of said outboard housing sections, disposing each said valve member in the other of said outboard housing sections, forming said intermediate housing section with a chamber therein interconnected to said inlet and leading to certain of said valve constructions, forming said other housing section with a plurality of valve seats respectively controlled by said valve members and with a plurality of outlets respectively associated with said valve seats, forming at least one of said valve constructions to have its said actuator stem passing through its respective valve seat whereby said valve seat of said one valve construction is intermediate said valve member thereof and said diaphragm means thereof, and forming said valve member of said one valve construction to be movable on its respective actuator stem.

7. A method of making a control means as set forth in claim 6 and including the steps of forming said actuator stem of said one valve construction with a shoulder, and disposing a spring to be carried by said actuator stem of said one valve construction and bear against said valve member thereof in a direction tending to hold said valve member against said shoulder.

8. A method of making a control means as set forth in claim 7 wherein said step of disposing said spring causes said spring to bear against said valve member in a direction that tends to close said valve seat of said one valve construction.

9. A method of making a control means as set forth in claim 8 and including the step of forming said one valve construction with a second valve seat in said other housing section adapted to be opened and closed by said valve member thereof.

10. A method of making a control means as set forth in claim 8 and including the step of forming said one valve construction to have said valve seat thereof exposed to said chamber on the side of said valve seat opposite the side thereof that is controlled by said valve member thereof whereby said spring performs a relief valve function for said chamber.

* * * * *